United States Patent [19]

Edgar et al.

[11] Patent Number: 5,383,202

[45] Date of Patent: Jan. 17, 1995

[54] SIMPLIFIED METHOD OF ATTENUATION OF LOGARITHMICALLY CODED DIGITAL SIGNALS

[75] Inventors: Gregory A. Edgar, Euless; Jeff Klingberg, Fort Worth; John Ruppel, North Richland Hills, all of Tex.

[73] Assignee: Motorola, Inc., Schaumburg, Ill.

[21] Appl. No.: 981,563

[22] Filed: Nov. 25, 1992

[51] Int. Cl.6 .......................... H04L 1/20; H04B 15/00
[52] U.S. Cl. ........................................ 371/30; 375/34; 375/99
[58] Field of Search .......................... 371/30, 37.1, 53; 375/34, 99, 104; 381/94; 455/218, 219, 222, 296

[56] References Cited

U.S. PATENT DOCUMENTS 4,608,456  8/1986  Paik et al. .......................... 380/28

Primary Examiner—Stephen M. Baker
Attorney, Agent, or Firm—Kevin A. Buford

[57] ABSTRACT

A method is provided of attenuating a signal value within erroneous frames of a logarithmically coded digital signal. The method includes the steps of detecting an erroneous frame of the logarithmically coded digital signal and adding an attenuation value to a frame exponent of the erroneous frame.

8 Claims, 1 Drawing Sheet

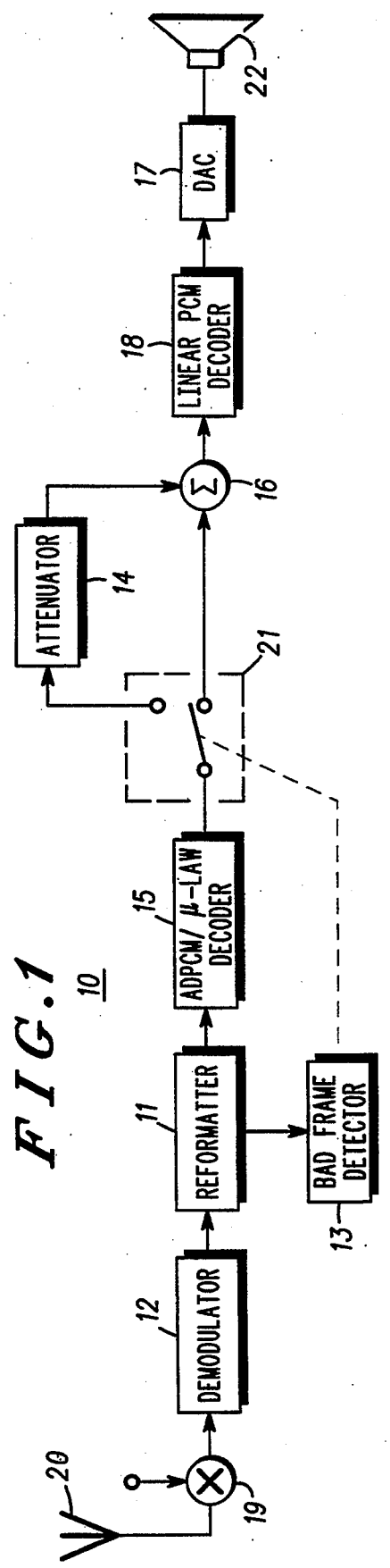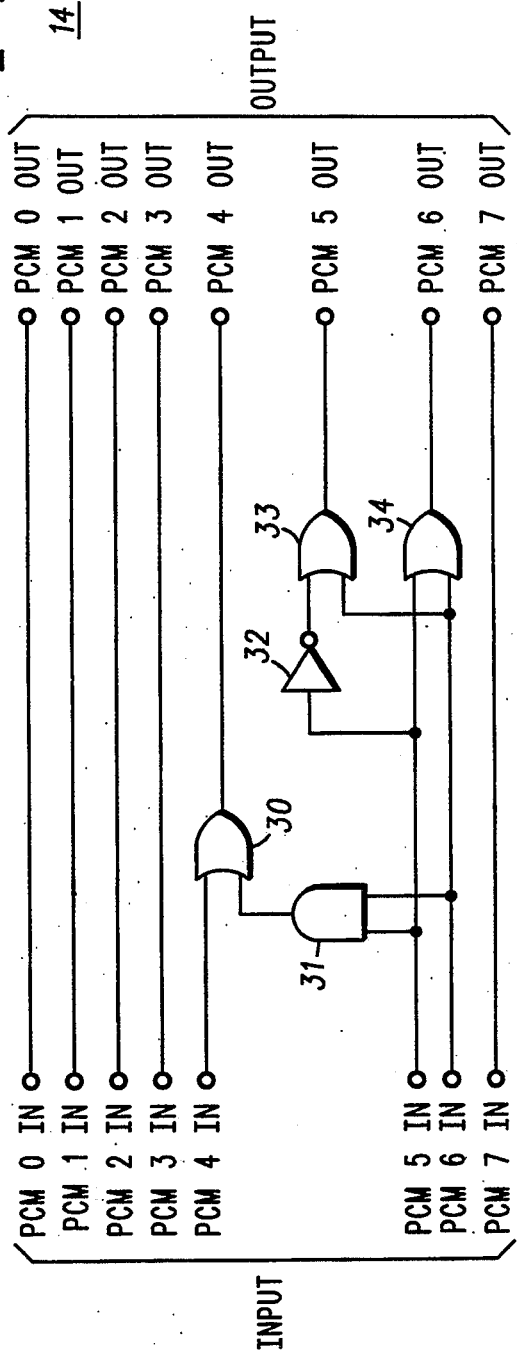

SIMPLIFIED METHOD OF ATTENUATION OF LOGARITHMICALLY CODED DIGITAL SIGNALS

FIELD OF THE INVENTION

The field of the invention relates to communication systems and in specific to attenuating of voice signals within communication systems.

BACKGROUND OF THE INVENTION

Muting systems for radio frequency (RF) receivers are known. Such systems have been used to suppress noise at an output of a radio receiver. In older radios muting systems were used to suppress noise at the output of the radio by disabling the audio output of a received signal in the absence of a desired signal. In such cases muting is activated by comparison of a received signal with a threshold value. If the received signal does not exceed the threshold then the signal was deemed absent and the radio muted. Where a competing signal stronger than the desired signal was present, on the other hand, the muting system fails.

Muting systems in radios, in the past, have been provided to improve the quality of audio signals perceived by an operator. Such muting systems accomplished such objective by completely suppressing the received signal or simply reducing the output level of the signal.

Digital error detection systems are also known. Error detection systems are pervasively used where digital signals are exchanged. Such detection systems typically include a parity bit or some other indication of the accuracy of the information within a transmitted digital word.

In the context of contemporary digital radio communication systems, audio signals are typically converted into digital representations of the audio signal and transmitted within frames containing error correction/detection coding. A digital receiver within the system, upon receipt of a frame of information, compares the received information with the error coding as a measure of the accuracy of the received data word. If the error coding indicates that the data is erroneous the receiver simply discards the erroneous data.

The suppression of erroneous data in digital receivers has largely replaced the muting function of earlier radios. Since only erroneous data is discarded an intelligible signal may be recovered even under conditions of weak signal reception.

While error detection systems have considerably improved the performance of radio receivers over prior art analog systems, problems are still experienced under conditions of very weak signal reception or where a significant portion of the data is corrupted. Where significant errors exist within a received signal, a large percentage of the signal may be discarded. Without the missing data the received signal may have audio gaps producing a choppy audio effect that may, or may not, be intelligible.

Prior art muting systems were typically provided with an fixed attenuation level depending on a signal threshold. With the adjustable threshold, a very weak signal including considerable interference may still be discernable by an operator. Digital systems that delete erroneous data do not have the capability of allowing partially corrupted data to be monitored by an operator. Because of the importance of communication systems a need exists for a method of including at least a portion of corrupted data within a recovered signal.

SUMMARY OF THE INVENTION

A method is provided of attenuating a signal value within erroneous frames of a logarithmically coded digital signal. The method includes the steps of detecting an erroneous frame of the logarithmically coded digital signal and adding an attenuation value to a frame exponent of the erroneous frame.

BRIEF DESCRIPTION OF THE DRAWINGS

FIG. 1 is a block diagram of a receiver in accordance with one embodiment of the invention.

FIG. 2 is a block diagram of an attenuator in accordance with one embodiment of the invention.

DETAILED DESCRIPTION OF THE PREFERRED EMBODIMENT

The solution to the problem of gaps in a recovered audio signal caused by discarded data lies, conceptually, in retaining the erroneous frames, attenuating an audio signal within such frames, and recombining with otherwise good frames. Attenuation of bad frames reduces the impact of bad frames within an audio signal yet still preserves information that otherwise may still be discernable to an operator.

Shown in FIG. 1 is a block diagram of a digital radio frequency (RF) receiver, generally (10), in accordance with the invention. Included within the receiver (10) is a mixer (19), a demodulator (12), reformatter (11), bad frame detector (13), attenuator (14), ADPCM/$\mu$-Law decoder (15), switch (21), summer (16), linear PCM decoder (18), digital to analog converter (DAC) (17) and speaker (22). The mixer (19) provides a means for reducing a received RF signal to a zero-RF frequency for processing of voice frames.

The received signal may be transmitted under any appropriate modulation method including amplitude modulated (AM), frequency modulated (FM), phase modulation, or any of the multilevel-modulation techniques (e.g. quaternary phase shift keying (QPSK), or 16, 64, or higher, quadrature amplitude modulated (QAM) signals). The demodulator (12), operating under a suitable demodulation technique, demodulates the zero-RF signal to produce a pulse code modulated (PCM) signal containing voice and control information within a series of voice frames.

Control information, contained within each voice frame, includes a bad frame status indicator. The bad frame status indicator, provides a means for detecting bad frames and may be in the form of a cyclic redundancy check (CRC).

The demodulated signal, from demodulator (12), may be any pulse code modulated (PCM) signal such as the adaptive differential pulse code modulated (ADPCM) signal. ADPCM is chosen, under the preferred embodiment, because of the low encoding delay and high voice quality in the absence of errors. Forward error correcting coding is unnecessary, under the preferred embodiment, because of the presence of the CRC and the beneficial attenuation of erroneous frames.

The demodulated ADPCM signal after being demodulated (12) is reformatted, within reformattor (11), to recover the CRC codes embedded within each frame. The CRC codes are applied to a means for detecting bad frames (bad frame detector) (13) along with each raw speech frame. The bad frame detector (13) calculates a local CRC value from the raw speech frame and compares it with the received CRC, recovered from the demodulated signal. If the local CRC matches the received CRC then the frame is assumed to be good (free from errors).

When the received frame is received free of errors the frame is processed through the ADPCM/μ-Law decoder (15) (where the ADPCM signal is converted into μ-Law) and switch 21, to the adder (16) where is is concatenated with prior frames. The frame is then decoded into linear PCM within decoder (18) and converted into an analog signal within an digital to analog converter (17) and transmitted to an audio speaker (22).

If the local CRC does not match the received CRC, then the bad frame detector (13) outputs an indicated error, activating the switch (21) and providing an input to the attenuator (14). Upon activation of the switch (21) the bad frame passes through the attenuator (14) and is attenuated by an attenuation factor. From the attenuator (14) the attenuated erroneous signal is then concatenated with prior frames (within the summer (16)), decoded (18) and transmitted to an audio speaker (22).

Within the attenuator (14) attenuation occurs based upon manipulation of certain bits of the μ-Law frame (see Table 1 for information on bit usage).

TABLE 1

| Bit # | 7 | 6 | 5 | 4 | 3 | 2 | 1 | 0 |
|---|---|---|---|---|---|---|---|---|
| | S | C | C | C | S | S | S | S |
| | I | H | H | H | T | T | T | T |
| | G | O | O | O | E | E | E | E |
| | N | R | R | R | P | P | P | P |
| | | D | D | D | | | | |
| Max+ | 1 | 0 | 0 | 0 | 0 | 0 | 0 | 0 |
| Zero+ | 1 | 1 | 1 | 1 | 1 | 1 | 1 | 1 |
| Zero− | 0 | 1 | 1 | 1 | 1 | 1 | 1 | 1 |
| Max− | 0 | 0 | 0 | 0 | 0 | 0 | 0 | 0 |

As is well known, bit #7 of the μ-Law frame is a sign bit (as indicated by the word "sign" shown vertically below bit #7), bits #4–6 are chord bits, and bits #0–3 are step bits. As is also well known, maximum μ-Law signal values occur upon the incidence of all zeros in the chord and step bits. In evaluating a μ-Law frame, step bits are adjusted in value by an exponential represented by the chord bits.

Attenuation, in accordance with one embodiment of the invention, is accomplished through manipulation of frame exponent bits (chord bits 4–6). It has been determined that manipulation of bit #4–6 (by addition of a attenuation factor having a magnitude of 2 (binary value 10) to chord bits 4–6) results in a 12 dB attenuation of the signal contained within by the μ-Law frame. It has also been determined that a reduced attenuation factor (less than 2) can result in a reduced noise factor for small values of step and chord values. Shown in Table 2 are values of attenuation factors found to produce superior results.

TABLE 2

| UNMUTED CHORD | MUTED CHORD | ATTENUATION FACTOR |
|---|---|---|
| 000 | 010 | 2 |
| 001 | 011 | 2 |
| 010 | 100 | 2 |
| 011 | 101 | 2 |
| 100 | 110 | 2 |
| 101 | 111 | 2 |
| 110 | 111 | 1 |

TABLE 2-continued

| UNMUTED CHORD | MUTED CHORD | ATTENUATION FACTOR |
|---|---|---|
| 111 | 111 | 0 |

FIG. 2 is a schematic of an attenuator (14) in accordance with one embodiment of the invention. FIG. 2 has been determined to provide the muted chord values of TABLE 2 in response to unmuted chord input values. Such muted chord output values are provided by operation of OR gates 30, 33, and 34, AND gate 31, and inverter (NOT gate) 32.

As shown unmuted chord values of 000, 001, 100, or 101 on bits 4–6 result in outputs of 010, 011, 110, or 111, respectively through operation of the NOT gate (32) and OR gate (33). Unmuted inputs of 010 or 011 result in outputs of 100 and 101, respectively, through operation of the NOT gate (32), and OR gates (33 and 34). An input of 110 results in an output of 111 through operation of AND gate (31) and OR gate (30).

The many features and advantages of this invention are apparent from the detailed specification and thus it is intended by the appended claims to cover all such features and advantages of the system which fall within the true spirit and scope of the invention. Further, since numerous modifications and changes will readily occur to those skilled in the art (application to A-Law logarimically coded digital signals), it is not desired to limit the invention to the exact construction and operation illustrated and described, and accordingly all suitable modifications and equivalents may be resorted to, falling within the scope of the invention.

It is, of course, to be understood that the present invention is, by no means, limited to the specific showing in the drawing, but also comprises any modification within the scope of the appended claims.

We claim:

1. A method of attenuating a signal value within erroneous frames of a logarithmically coded digital signal, such method comprising the steps of: detecting an erroneous frame of the logarithmically coded digital signal; and adding an attenuation value to a frame exponent of the erroneous frame.

2. The method as in claim 1 further including the step of adding an attenuation factor to a frame exponent of the erroneous frame further includes adding a one to the second least significant bit of a logarithmically coded digital signal having three frame exponent bits.

3. The method as in claim 1 further including the step of adding an attenuation factor to a frame exponent bit of the erroneous frame further includes adding a one to the second least significant bit of a logarithmically coded digital signal having three frame exponent bits and a magnitude of the three frame exponent bits of from zero to five.

4. The method as in claim 3 further including the step of adding an attenuation factor to a frame exponent bit of the erroneous frame further includes adding a one to the least significant bit of a logarithmically coded digital signal having three frame exponent bits and a magnitude of the three frame exponent bits of six.

5. A method of attenuating a signal value within erroneous frames of a logarithmically coded digital signal, such method comprising the steps of: detecting an erroneous frame of the logarithmically coded digital signal; adding a first attenuation value to a plurality of frame exponent bits having a first set of values and a second attenuation value to the plurality of frame exponent bits having a second value.

6. The method as in 5 wherein the first attenuation value has a magnitude of two for a logarithmically coded digital signal having three frame exponent bits and a first set of values within a range of zero to five.

7. The method as in claim 6 wherein the second attenuation value has a magnitude of one for a logarithmically coded digital signal having three frame exponent bits and a second value of six.

8. A method of attenuating a signal value within erroneous frames of a logarithmically coded digital signal, such method comprising the steps of: detecting an erroneous frame of the logarithmically coded digital signal; adding an attenuation factor to frame exponent bits for frame exponent values of from zero to five; adding an attenuation value of one to the frame exponent bits for a chord value of six; and a value of zero to the exponent bits for a frame exponent value of seven.

* * * * *